United States Patent Office 3,241,987
Patented Mar. 22, 1966

3,241,987
HIGH DENSITY, HIGH REFRACTORY CERAMIC
COMPOSITION FOR OPEN HEARTH FURNACE
BOTTOMS AND METHOD
Alfred P. Dreyling, South River, and Lewis J. Dreyling,
East Brunswick, N.J., assignors to Quigley Company,
Inc., a corporation of New York
No Drawing.  Filed Feb. 16, 1962, Ser. No. 173,839
7 Claims.  (Cl. 106—58)

This invention pertains to the production of high density, high refractory ceramic compositions with low porosity and therefore low slag penetration for use in the production of bottoms for open hearth furnaces.

Most of the compositions in use today, in which magnesia salts form the major portion of the basic refractory material, include salts of chromic, silicic, boric, phosphoric, hydrofluoric, and like acids which isolubilize free magnesium elements and function as binders. Because of the use of such salts as binders, after their reaction upon heating with the magnesia salts, these inorganic salts leave a residue of alkalies or metals which reduce the refractoriness of the composition. It seems rather odd and contrary to good engineering practice to start with the most highly purified magnesia or magnesite in order to obtain the ultimate in refractoriness of the end composition and then introduce binders which leave contaminants that will directly affect and reduce the refractoriness of said composition.

The instant composition was conceived to overcome the foregoing objections and contemplates the use of organic binders, volatile inorganic binders, or combinations of both, which are highly volatile in nature but still stable enough to act as temporary binders until they are decomposed on the initial heating and thus leave no contaminating residue whatsoever and hence avoid any loss in refractoriness of the final composition.

According to the instant invention, two different types of compositions may be produced as follows:

(1) A composition in which water is employed on the job site to dissolve the organic or volatile inorganic binders or combinations thereof and cause them to react with the magnesia base refractory material.

(2) A ready-to-use composition capable of being shipped in sealed containers for immediate use at the job site and in which the organic or volatile inorganic binders or combinations thereof are present, the organic binders acting as the initial binders and in addition as vehicles which will dissolve the final volatile inorganic binders and acting as refractory binders for the magnesia base refractories.

The instant invention also contemplates the use of organic or volatile inorganic binders or combinations thereof which will increase the imperviousness of the ceramic composition without forming low refractory glasses and so control the density and porosity of said ceramic composition and thus control slag penetration and increase the life of said composition.

Another feature of the invention is the addition of a barrier material to prevent the reaction of the binders in dry form when water in trace amounts is present and the composition is stored prior to use and thereby prevent spoilage. The barrier material per se is made up of a combination of materials, one of which tends to prevent the migration of the other material from the mass during storage and ageing. The barrier material may be made to act in two ways as follows:

(1) To absorb any water that may be present in the refractory material and therefore of the dehydrating vehicle type and functioning by virtue of preferential absorption of water. In the use of this type of barrier, the material is used to first coat the organic or volatile inorganic binders or combinations thoroughly before mixing them with the rest of the composition.

(2) To coat the organic or volatile inorganic binders or combinations thereof with a protective film to prevent them from coming into direct contact with the other composition components which may contain moisture and again prevent the binders from reacting. Such a barrier material is of the coating vehicle type.

In this manner, spoilage of the refractory composition during storage may be controlled and both types of barriers are effective and may be used without changing or affecting the refractoriness of the composition but the first type is preferred, in that it allows the greater period of storage before use. It may also be added here that the barrier materials function not only as barriers against the destabilizing effects of moisture but in addition serve as a temporary binder prior to the firing of the refractory mass.

In the selection of binders, it may be stated that ammonium compounds, although volatile, should be shunned as impractical due to the liberation of ammonia during the processing of products made with these salts. It is of course possible to use some of the organic ammonium compounds in small quantities or use may be made of an absorption media such as citric acid to stabilize the ammonium salts during use and before firing.

The types of ingredients that will be employed to result in compositions having certain characteristics exemplifying the various phases of the instant invention are shown in the following Examples 1, 2 and 3.

Example 1

Portion No. 1.—Refractory portion: Percent
   Magnesia (dead burned or fused)—
      Coarse aggregates, 40 to 65%; fine aggregates, 35 to 60% _____ 85 to 98
Portion No. 2.—Binder portion:
   Organic binders; volatile inorganic binders; combinations of organic binders and volatile inorganic binders _____ 2.0 to 15

The above percentages are by weight.

In the preparation of the above example, the ingredients of Portion No. 2 are intimately and thoroughly mixed in dry form first and then added to Portion No. 1 and the two portions again intimately and thoroughly mixed in dry form. In the use of this type of mixed composition, water to a maximum of 10% based on the weight of the total composition is added, the mass again thoroughly and intimately mixed and applied in plastic condition to the substrate (bottom) by ramming. The stability of this type of composition is limited and therefore must be mixed and used in relatively short periods of time. (Approximately a maximum period of 30 days). This composition is one in which no barrier material is present but it does contain organic and volatile inorganic binders and combinations thereof and is therefore one which has a limited stability and must therefore be used soon after its preparation.

EXAMPLE 2

Portion No. 1.—Refractory portion: Percent
   Magnesia (dead burned or fused)—
      Coarse aggregates, 40 to 65%; fine aggregates, 35 to 60% _____ 85 to 98
Portion No. 2.—Binder portion:
   Organic binders; volatile inorganic binders; combinations of organic and volatile inorganic binders _____ 1.5 to 10
Portion No. 3.—Barrier portion:
   Volatile organic barrier materials _____ 0.5 to 5.0

The above percentages are by weight.

In the preparation of the above Example 2, the ingredients of Portion No. 3, which consist of the volatile organic barrier materials, are first intimately and thoroughly mixed together and then added to the ingredients of Portion No. 2, which have already been intimately and thoroughly mixed in dry form, and then this combination of the two portions is thoroughly and intimately mixed in order to coat the ingredients of Portion No. 2 with the ingredients of Portion No. 3, after which the combination of Portion Nos. 2 and 3 is added to Portion No. 1 and the three portions are thoroughly and intimately mixed to result in the final composition ready for use. It may be added here that this composition possesses greater stability and therefore greater storage life than Example No. 1. However, in the use of this composition, water must be added up to a maximum amount of 10% by weight of the total composition before applying it to the hearth substrate (bottom).

Example 2 is one in which either the dehydrating vehicle type or the coating vehicle type of barrier material may be employed and further examples of this will be given in actual composition form.

The following example is one in which either the dehydrating vehicle type or the coating vehicle type of barrier material may be employed but the material will include additional organic materials, a part of which may be in solvent form and perform their function by activating the binders by solvent action while still performing their original function of barrier material and therefore obviate the necessity of adding water before use.

EXAMPLE 3

| | Percent |
|---|---|
| Portion No. 1.—Refractory portion: Magnesia (dead burned or fused)— Coarse aggregates, 40 to 65%; fine aggregates, 35 to 60% | 85 to 98 |
| Portion No. 2.—Binder portion: Organic binders; volatile inorganic binders; combinations of organic and volatile inorganic binders | 1.5 to 10 |
| Portion No. 3.—Barrier portion: Volatile organic barrier materials (a portion of the organic barrier materials may be solvents and function to activate the binders without the use of water) | 0.5 to 5.0 |

The above percentages are by weight.

In the preparation of the above cited Example 3, the ingredients of Portion No. 3, which consist of volatile organic barrier materials and organic solvents for a portion of the binders, are first intimately and thoroughly mixed together and then added to Portion No. 2, whose ingredients have already been intimately and thoroughly mixed in dry form, and then this mixture again thoroughly and intimately mixed to thoroughly coat the ingredients of Portion No. 2 with the ingredients of Portion No. 3 to insure that the barrier material performs its task, after which this combination of mixtures is added to Portion No. 1 and again thoroughly and intimately mixed to result in the finished product. It may be noted that, when Portion No. 3 is mixed with Portion No. 2, a dissolution of a portion of the binders contained in Portion No. 2 occurs to thus develop a condition which makes it unnecessary to add water to the mix before using. In other words, this mix has extreme stability and storage ability and may be stored for a period of three months or more before use.

In the following tables will be disclosed a series of compounds which may be used in the above Examples 1, 2 and 3 and which will be disclosed and used in further working examples.

Refractory portion.—Magnesia (dead burned or fused):
In suitable graduated grain size for end use as stipulated in the folowing table—

| | Percent |
|---|---|
| Coarse aggregates, through 5 mesh screen and on 30 mesh screen | 40 to 65 |
| Fine aggregates, through 30 mesh screen to through 325 mesh screen (screen sizes ASTM) | 35 to 60 |

Organic binders:
    Tri isopropylamine borate
    Mono-ethylamine complex of boron fluoride
    Mono-ethylamine boron trifluoride
Volatile inorganic binders:
    Ammonium penta borate
    Ammonium phosphate (mono basic)
    Ammonium biborate
Combinations of organic and volatile inorganic binders:
    Suitable combinations of the above for specified end uses.
Barrier materials organic:
    Dehydrating type barrier—
        Cellosolve (ethylene glycol mono-ethyl ether)
        Isopropyl alcohol
        Ethylene glycol
    Coating type barrier—
        Tri chlorethylene
        Aromatic hydrocarbons Where the reaction of the above disclosed binders to be used in the compositions are too slow for certain applications, accelerators such as ammonium fluoride, ammonium fluoborate, cryolite or similar known materials may be added to a maximum of 2% of the total composition by weight to speed up the action of said binders.

The action of the organic binders, volatile inorganic binders or combinations of both is such that the binding materials having basic components contained therein are of such a type that the basic components are driven off in gaseous form at comparatively low temperatures when the composition is heated to leave acid materials only which are capable of reacting with the magnesia to form compounds of magnesia as the composition is heated to still higher temperature for forming a comparatively pure magnesia compound homogeneous mass free from any contamination. When barrier materials are used the additional organic materials which are added to the binders and a part of which may be in solvent form will perform their functions and in addition will serve to activate the binders by solvent action and thus eliminate the necessity of adding water before using.

The ingredients which may be used in Example 1 are disclosed in the following (actual) Example 4.

EXAMPLE 4

| | Percent |
|---|---|
| Portion No. 1.—Refractory portion: Magnesia (dead burned or fused)— Coarse aggregates, 40 to 65%; fine aggregates, 35 to 60% | 96.5 |
| Portion No. 2.—Binder portion: Volatile inorganic binder; ammonium penta borate, 2.5%; citric acid (used to stabilize the ammonium penta borate), 1.0% | 3.5 |

The above percentages are by weight.

The above Example 4 composition will be prepared in accordance with the disclosure given in Example 1.

The ingredients which may be used in Example 2 are disclosed in the following (actual) Example 5.

EXAMPLE 5

Portion No. 1.—Refractory portion:      Percent
  Magnesia (dead burned or fused)—
    Coarse aggregates, 40 to 65%; fine aggregates, 35 to 60% _____ 96.5
Portion No. 2.—Binder portion:
  Volatile inorganic binder—
    Ammonium penta borate _____ 2.5
Portion No. 3.—Barrier portion:
  Volatile organic barrier (dehydrating vehicle type)—
    Isopropyl alcohol, 0.8%; rosin, 0.2% ____ 1

The above percentages are by weight.

The above Example 5 composition will be prepared in accordance with the disclosure given in Example 2. In this example, the barrier material is of the dehydrating vehicle type and functions by absorbing the moisture that may be present in the refractory material. If it is desired to make a composition in which the barrier material is to coat the binder ingredients with a protective film to thus prevent them from absorbing moisture, an aromatic hydrocarbon such as xylol is substituted for the isopropanol with the rosin remaining as it is.

The ingredients which may be used in Example 3 are disclosed in the following (actual) Example 6.

EXAMPLE 6

Portion No. 1.—Refractory portion:      Percent
  Magnesia (dead burned or fused)—
    Coarse aggregates, 40 to 65%; fine aggregates, 35 to 60% _____ 94.0
Portion No. 2.—Binder portion:
  Organic binder—
    Tri isopropylamine borate _____ 1.5
Portion No. 3.—Barrier portion:
  Volatile organic barrier (dehydrating vehicle type)—
    Cellosolve (ethylene glycol mono ethyl ether), 1.0%; isopropyl alcohol, 1.0%; ethylene glycol, 1.5%; rosin, 0.5%; tri chlorethylene, 0.5% _____ 4.5

The above percentages are by weight.

The above Example 6 composition will be prepared in accordance with the disclosure given in Example 3. Here again the barrier material will function by absorbing the moisture that may be contained in the refractory material. This particular composition may be used as it is prepared with no addition of water necessary.

It is now apparent that the instant invention allows the use of organic or volatile inorganic binders or combinations of both which, on being mixed with magnesia, react therewith to form a dense homogeneous mass on being fired, but which volatilize during said firing, after reacting, and therefore do not affect the refractoriness of the composition but leave it as a relatively pure magnesia ceramic refractory base having the essential physical properties necessary to make a dense durable open hearth bottom.

The magnesia basic material of Examples 4, 5 and 6 may be varied in grain size in order to accomplish the densities and porosities necessary for the particular service to which the bottom will be subjected within the grain sizing stipulated in the table contained herein.

There is a further operational variable which should be mentioned and that is the amount of water used in the mix and the necessity of thoroughly mixing the water into the composition. The amount of water contained in the mix is rather critical as well as the necessity of its being completely and evenly dispersed throughout the mix. In this connection, it may be stated that the water may be varied from 1 to 5% by weight where the mix is to be used for ramming. Where the mix is to be used for application by spraying, a greater quantity of water must be used, and the amount will of necessity depend on the type of equipment that is employed and the plasticity necessary at the nozzle.

It should be noted that it is possible, as occurs in Examples 2 and 3, to use volatile organic materials contained in the barrier portion as initial binders in the binder portion and in addition serve as vehicles to dissolve the final volatile inorganic binders and, in this way, make a composition that contains less ingredients but still functions properly with no reduction of refractoriness on heating.

There are many other organic or volatile inorganic compounds or combinations of both which may be used and the examples given herein are simply chosen to show the effect that may be achieved in practicing the instant invention. The examples are only illustrative of a few such compounds that may be employed for ceramic refractory compositions which will meet the various conditions encountered in open hearth furnace operation.

What is claimed is:

1. A ceramic composition for use in forming when fired, a highly dense refractory monolithic coating of low porosity on open hearth furnace bottoms, said composition containing from 85% to 98% by weight of magnesia of the class consisting of dead burned magnesia and fused magnesia and from 2% to 15% by weight of a binder material consisting of salt molecules each containing basic and acid components, the acid component containing an element of the class consisting of boron and phosphorous, said binder material having the property of not reacting with the magnesia before firing, said basic component being of such character that it will be driven off in gaseous form at the lower temperatures of firing and said acid component reacting with the magnesia at the higher temperatures of firing and forming magnesia compounds of high refractoriness and low porosity.

2. A composition according to claim 1, wherein the 85% to 98% of magnesia is composed of from 40% to 65% of coarse aggregates of screen sizing such that all goes through a 5 mesh screen and stays on a 30 mesh screen and 35% to 60% of fine aggregates of screen sizing such that all goes through a 30 mesh screen to through a 325 mesh screen.

3. A composition according to claim 1, wherein the binder material is of the class consisting of tri-isopropylamine borate, mono-ethylamine complex of boron fluoride, ammonium penta borate, ammonium phosphate (monobasic), ammonium bi-borate, and mixtures thereof.

4. A composition according to claim 1, containing an organic barrier material in effective amount for controlling the moisture in the composition and thereby inhibit the destabilizing effect of moisture on the binder material before use, said barrier material being of the class consisting of ethylene glycol mono-ethyl ether, isopropyl alcohol, ethylene glycol, trichloroethylene, xylol, and mixtures thereof and having the property of not reacting with the magnesia and with the binder material and being volatile so that during firing, it will be completely driven off at the lower temperatures of firing to permit reaction between the acid component of the binder material and the magnesia.

5. A composition according to claim 4, wherein the barrier material amounts to 0.5% to 5% by weight of the composition.

6. A ceramic composition for use in forming when fired, a highly dense refractory monolithic coating of low porosity on open hearth bottoms, said composition containing from 85% to 98% by weight of magnesia of the class consisting of dead burned magnesia and fused magnesia, from 2% to 15% by weight of a binder material of the class consisting of tri-isopropylamine borate, mono-ethylamine complex of boron fluoride, ammonium penta borate, ammonium phosphate (monobasic), ammonium bi-borate, and mixtures thereof and effective amounts of barrier material for controlling the moisture in the composition and thereby inhibiting reaction between the magnesia and the barrier material before use, said barrier material being of the class consisting of ethylene glycol mono-ethyl ether, isopropyl alcohol, ethylene glycol, tri-chloroethylene, xylol, and mixtures thereof.

7. A method of producing a high density high refractory ceramic monolithic coating of low porosity on open hearth furnace bottoms, which comprises preparing a high density refractory ceramic composition containing from 85% to 98% by weight of magnesia of the class consisting of dead burned magnesia and fused magnesia and from 2% to 15% by weight of a binder material which consists of salt molecules, each containing basic and acid components, the acid component containing an element of the class consisting of boron and phosphorous, and which has the property of not reacting with the magnesia before firing, said basic component being of such character that it will be driven off in gaseous form at the lower temperatures of firing and said acid component being of such character that it will react with the magnesia at the higher temperatures of firing and form magnesia compounds of high refractoriness and low porosity, said composition being in sufficiently loose settable form to permit said composition to be applied onto said bottoms and shaped, applying said composition to the furnace bottoms and then firing the composition.

References Cited by the Examiner

UNITED STATES PATENTS 2,579,781  12/1951  Austin et al. _____ 106—58

FOREIGN PATENTS 582,595  9/1959  Canada.
870,115  6/1961  Great Britain.

TOBIAS E. LEVOW, *Primary Examiner.*

JOHN H. MACK, *Examiner.*